(12) United States Patent
Yetukuri et al.

(10) Patent No.: US 6,957,858 B2
(45) Date of Patent: Oct. 25, 2005

(54) DYNAMIC FLIP-UP HEAD RESTRAINT

(75) Inventors: Nagarjun Yetukuri, Rochester Hills, MI (US); Mladen Humer, East Points, MI (US); Kaur Grewal, South Lyon, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/758,896

(22) Filed: Jan. 16, 2004

(65) Prior Publication Data

US 2005/0168020 A1 Aug. 4, 2005

(51) Int. Cl.$^7$ ........................ B60N 2/427; B60R 21/056; A47C 7/38
(52) U.S. Cl. .................... 297/216.12; 297/408
(58) Field of Search ............................ 297/216.12, 408

(56) References Cited

U.S. PATENT DOCUMENTS

| | | | | |
|---|---|---|---|---|
| 4,370,898 A | * | 2/1983 | Maruyama | ............... 297/408 X |
| 4,674,797 A | * | 6/1987 | Tateyama | .................... 297/408 |
| 5,378,043 A | | 1/1995 | Viano et al. | |
| 5,738,412 A | * | 4/1998 | Aufrere et al. | ............. 297/408 |
| 5,820,211 A | * | 10/1998 | Heilig et al. | ........... 297/216.12 |
| 5,842,738 A | * | 12/1998 | Knoll et al. | ........... 297/216.12 |
| 6,045,181 A | * | 4/2000 | Ikeda et al. | ............. 297/216.12 |
| 6,079,776 A | * | 6/2000 | Breitner et al. | ........ 297/216.12 |
| 6,082,817 A | * | 7/2000 | Muller | .................. 297/216.12 |
| 6,135,561 A | | 10/2000 | Kruger et al. | |
| 6,213,548 B1 | * | 4/2001 | Van Wynsberghe et al. | ..................... 297/216.12 |
| 6,565,150 B2 | | 5/2003 | Fischer et al. | |
| 6,604,788 B1 | | 8/2003 | Humer | |
| 6,623,073 B2 | | 9/2003 | Schafer et al. | |
| 6,688,697 B2 | * | 2/2004 | Baumann et al. | ... 297/216.12 X |
| 6,749,256 B1 | * | 6/2004 | Klier et al. | ............ 297/216.12 |

FOREIGN PATENT DOCUMENTS

JP 05269030 A * 10/1993 .................. 297/408

* cited by examiner

*Primary Examiner*—Rodney B. White
(74) *Attorney, Agent, or Firm*—Bill C. Panagos

(57) ABSTRACT

An active head restraint arrangement comprising a head restraint cushion, at least one head restraint post and head restraint post guide connecting said head restraint cushion to the interior of said passenger seats; and a flip-up assembly associated with said head restraint post beneath said head restraint cushion. Upon activation by rear impact, the flip-up assembly flips upward and forward to protect an occupant's head and neck from injury. Since this active head restraint arrangement utilizes a flip-up motion, the head restraint has a lower initial height that is dynamically increased upon activation. This feature allows the head restraint to be smaller allowing an occupant to have a better view around the head restraint.

9 Claims, 5 Drawing Sheets

DYNAMIC FLIP-UP HEAD RESTRAINT

FIELD OF INVENTION

This invention relates to head restraint arrangements for use in a motor vehicle. More specifically, it relates to an active head restraint arrangement.

BACKGROUND OF THE INVENTION

Today, most, if not all, motor vehicles come with seats equipped with head restraints. Head restraints provide not only comfort for riders but also protection for an occupant's head and neck in case of an accident. As more is learned about injuries to the head and neck, there is more of a demand to provide safer head restraints with more protection against injuries.

Many head restraint arrangements in motor vehicles are stationary. They may move up or down to meet a height requirement for the occupant or there may be some pivoting movement, but often times there is little other movement. Recently, there has been a trend to provide motor vehicles with a more interactive head restraint arrangement in cases of rear impact so as to protect the occupant's head or neck more fully.

U.S. Pat. No. 5,378,043 discloses a headrest that moves forward to meet the head and neck in impact situations. U.S. Pat. No. 6,604,788 B1 discloses a head restraint arrangement whereby the cushion portion of a seat is rotated forward when impacted from the rear that in turn operates a spring associated with the headrest and seat back to bias the headrest against pivotal movement. U.S. Pat. No. 6,565,150 B1 discloses another more interactive head restraint arrangement. In that invention, mechanisms are activated when the occupant's torso applies a rearward load or force on a target in the seat, as would happen in a rear impact situation. This target in the seat is then connected to the head rest and the head rest is then moved upwards and forward to meet the head and neck, thereby reducing injuries to the occupant. U.S. Pat. No. 6,623,073 B2 discloses yet another interactive head restraint arrangement. In this invention, the headrest is able to move upwards and forward to meet the head and neck and moves up to increase headrest height.

The problem with many of the traditional headrests and the more interactive head restraint arrangements is that the size of the headrests tend to be quite large. The large size helps to protect an occupant's head but at the same time makes it more difficult to see around while driving. This can lead to many problems, including driver error.

This invention is an improvement to current existing technologies in this field as it solves the above problems by allowing the head restraint simply to flip-up in cases of impact. This flip-up motion allows the head restraint arrangement to move not only forward, but also upwards as well. The head restraint begins at a lower initial height to allow for improved vision around the head restraint and will simply flip-up to dynamically increase head restraint height so as to better meet the head in a rapid fashion.

SUMMARY OF THE INVENTION

This invention relates to an active head restraint arrangement for passenger seats in motor vehicles providing upward and forward protective motion of occupant's head and neck in rear impact situations comprising a head restraint cushion, at least one head restraint post extending from the head restraint cushion and into the interior of the passenger seats, and a flip-up assembly associated with the head restraint post located beneath the head restraint cushion.

The flip-up assembly further comprises a top flip-up member, a push rod, a frame attached to a spring-loaded release arm, a latch with teeth, a middle flip-up member, a pivot arm, and a lower flip-up member. The frame is also attached to a trigger mechanism. The trigger mechanism is associated with the passenger seat or with the motor vehicle itself.

Upon activation, the trigger mechanism disengages the frame from the spring-loaded release arm. The spring-loaded release arm rotates and the push rod is moved upwards. As this occurs, the spring-loaded release arm is locked to a stop. The movement of the push rod enables the pivot arm to release the top flip-up member, middle flip-up member, and lower flip-up member. After full actuation of the top flip-up member, middle flip-up, and the lower flip-up member, the spring-loaded release arm locked to a stop snaps back and locks into the latch with teeth. The movement for the spring-loaded release arm is limited by the frame.

After activation, this active head restraint arrangement can be reset into its deactivated position.

DETAILED DESCRIPTION OF THE PREFERRED EMBODIMENT

In its preferred embodiment, this active head restraint arrangement will comprise a head restraint cushion 8, at least one head restraint post 10 extending from the head restraint cushion 8 to the interior of the passenger seats, and a flip-up assembly 12 associated with the head restraint post 10 located beneath the head restraint cushion 8. This active head restraint arrangement will provide upward and forward protective motion for an occupant's head and neck while keeping the head restraint size smaller than what is typically known so as to allow users better view around the head restraint.

Figure 1:
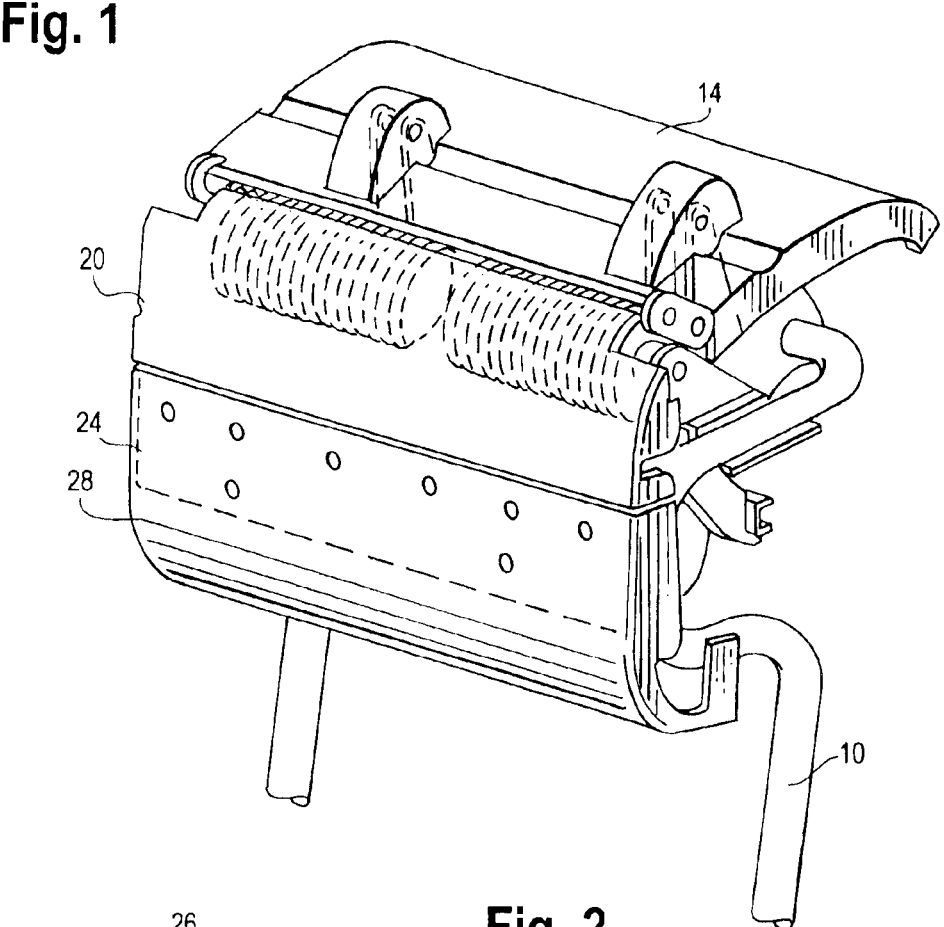
FIG. 1 is a front view of the head restraint arrangement without the head restraint cushion.
Figure 2:
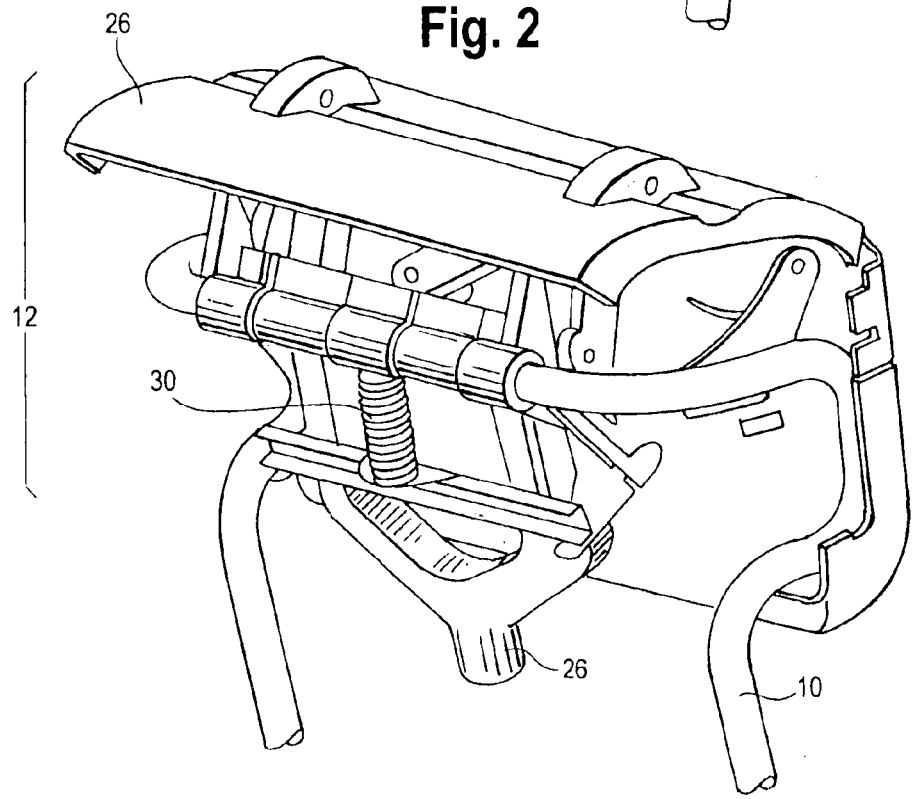
FIG. 2 is a rear view of the head restraint arrangement without the head restraint cushion.
Figure 3:
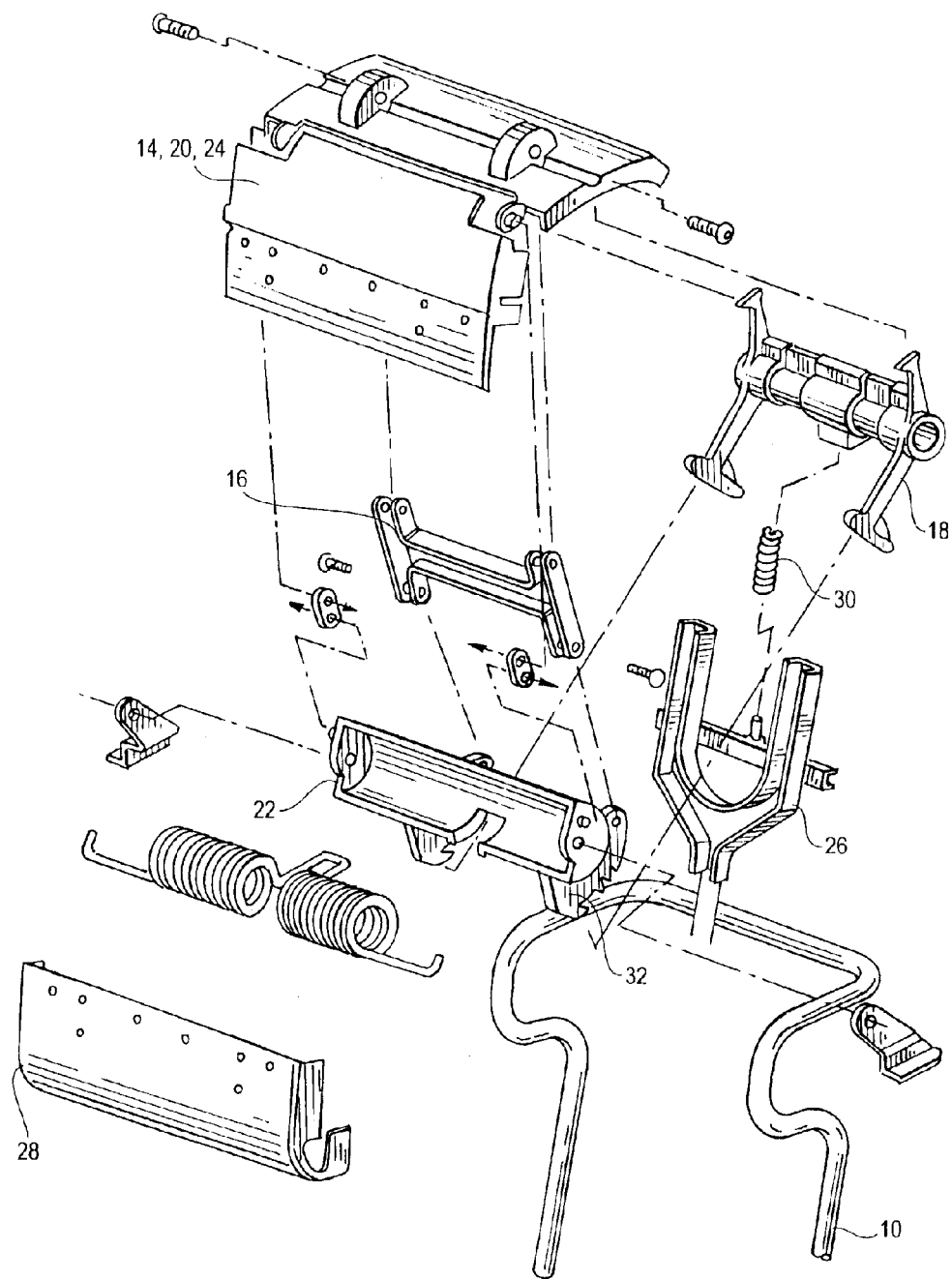
FIG. 3 is an exploded view of the head restraint arrangement.
Figure 4:
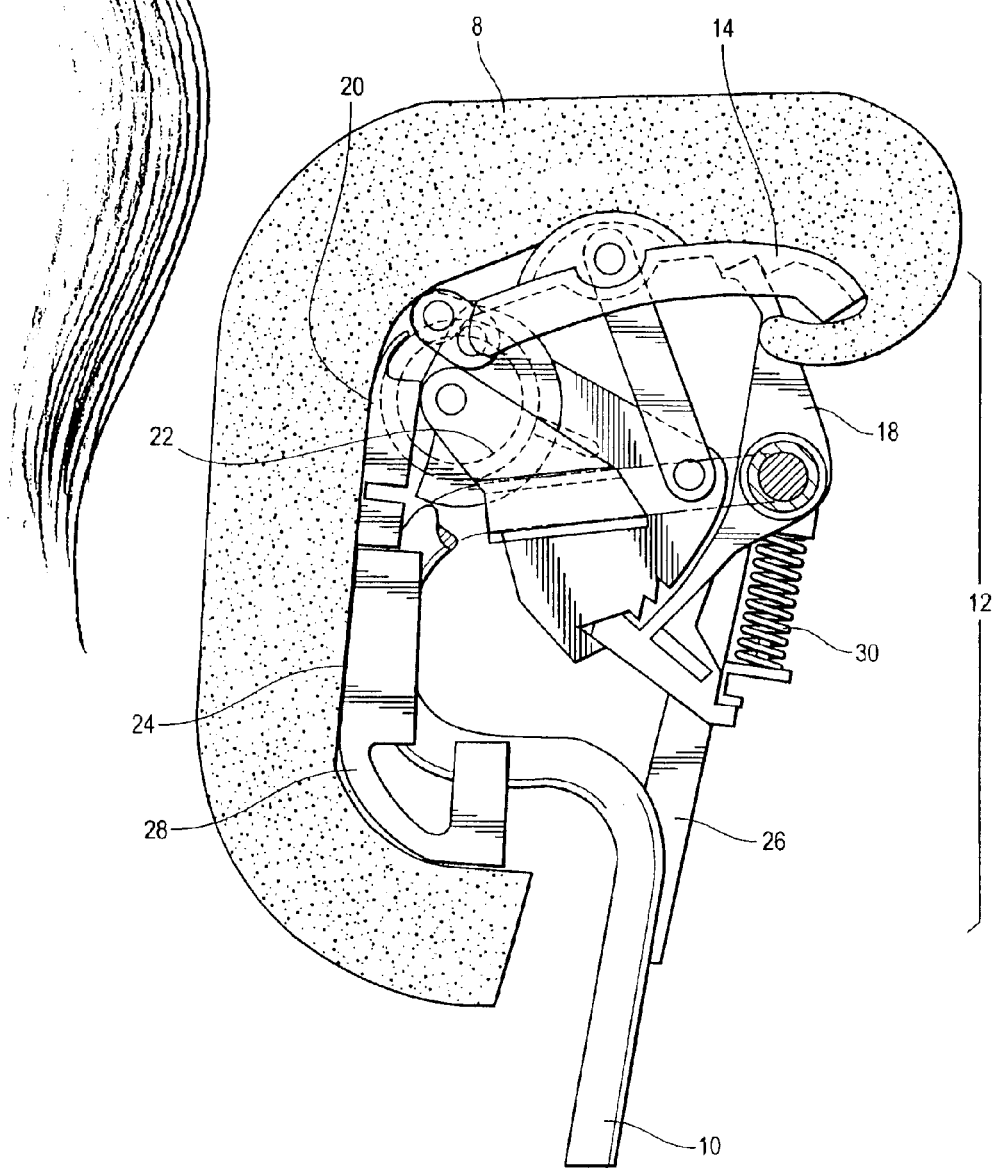
FIG. 4 is a cross-sectional view of the head restraint arrangement in its deactivated position.

Referring to FIG. 2 and FIG. 4, this flip-up assembly 12 is associated with the head restraint post 10 and head restraint cushion 8. It is located underneath the head restraint cushion 8 so as to still provide an occupant the desired comfort but also affording additional protection. This flip-up assembly 12 further comprises a top flip-member 14, a push rod 16, a frame 26 attached to a spring-loaded release arm 18, a latch with teeth 32, a middle flip-up member 20, a pivot arm 22, and a lower flip-up member 24. This frame 26 is also attached to the trigger mechanism (not shown) which is associated with the passenger seat, head restraint, or the motor vehicle itself. A lower anchor 28 fixes the flip-up assembly 12 to the head restraint post 10.

The trigger mechanism (not shown) can be anything that senses impact of the motor vehicle. The trigger mechanism (not shown) can be within the passenger seat, head restraint, or motor vehicle that feels an occupant's body moving in a certain position at a certain force. For example, the trigger mechanism (not shown) may sense the occupant's torso pressing into the seatback at a certain force after an impact. Another trigger may be seat acceleration or vehicle acceleration. When the seat accelerates to a certain point, the trigger mechanism (not shown) senses this movement and is activated. The triggers may also be used in combination with each other. Once the trigger mechanism (not shown) is activated, the frame 26 begins to activate this active head restraint arrangement.

It is possible for this invention to also use a pyrotechnic unit or a module of compressed air as a trigger mechanism (not shown). Using mechanisms such as these in conjunction with this invention would have the result very similar to that seen from air bag use. If these mechanisms are used, they would then have to be replaced and/or serviced after activation.

Figure 5:
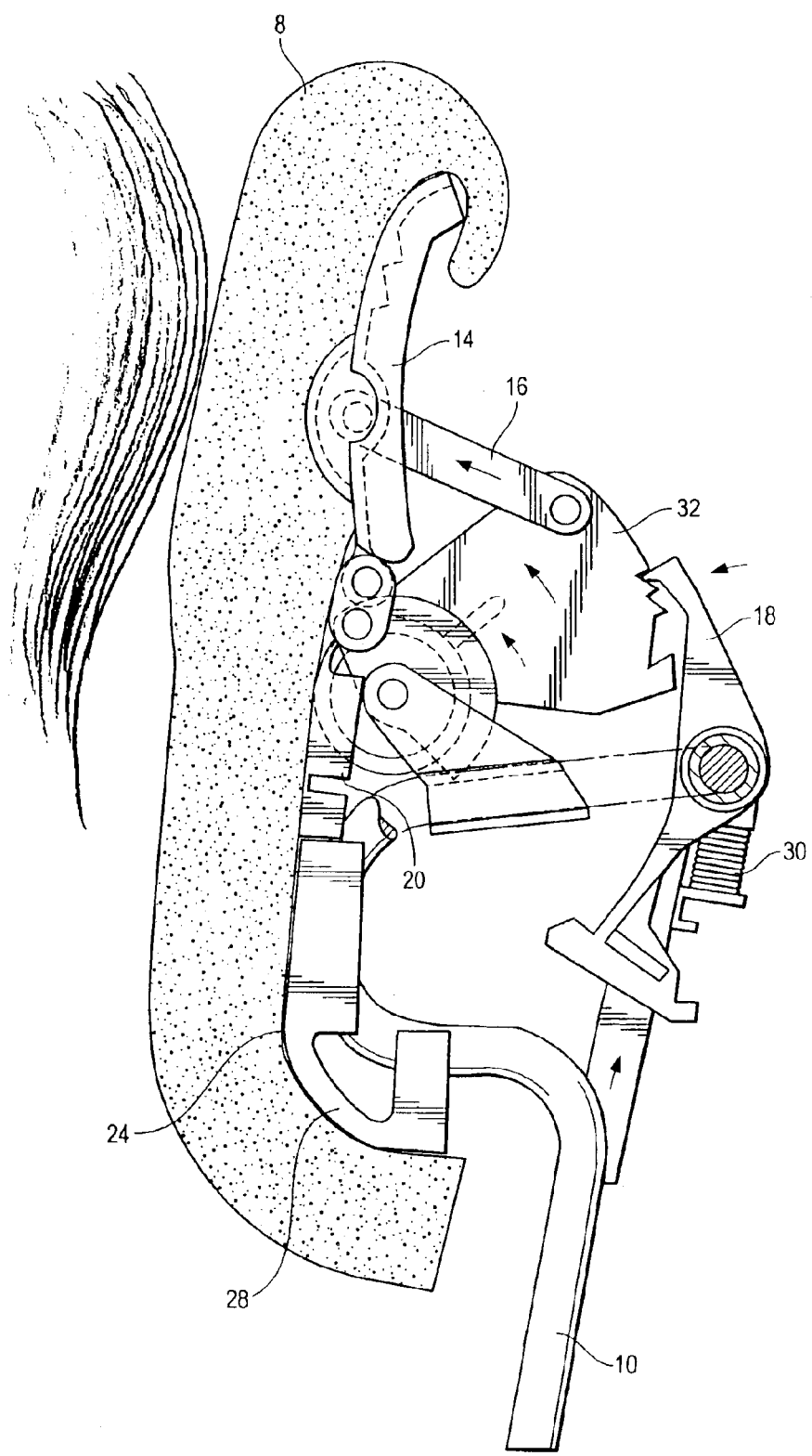
FIG. 5 is a cross-sectional view of the head restraint arrangement in its activated position.
Figure 6:
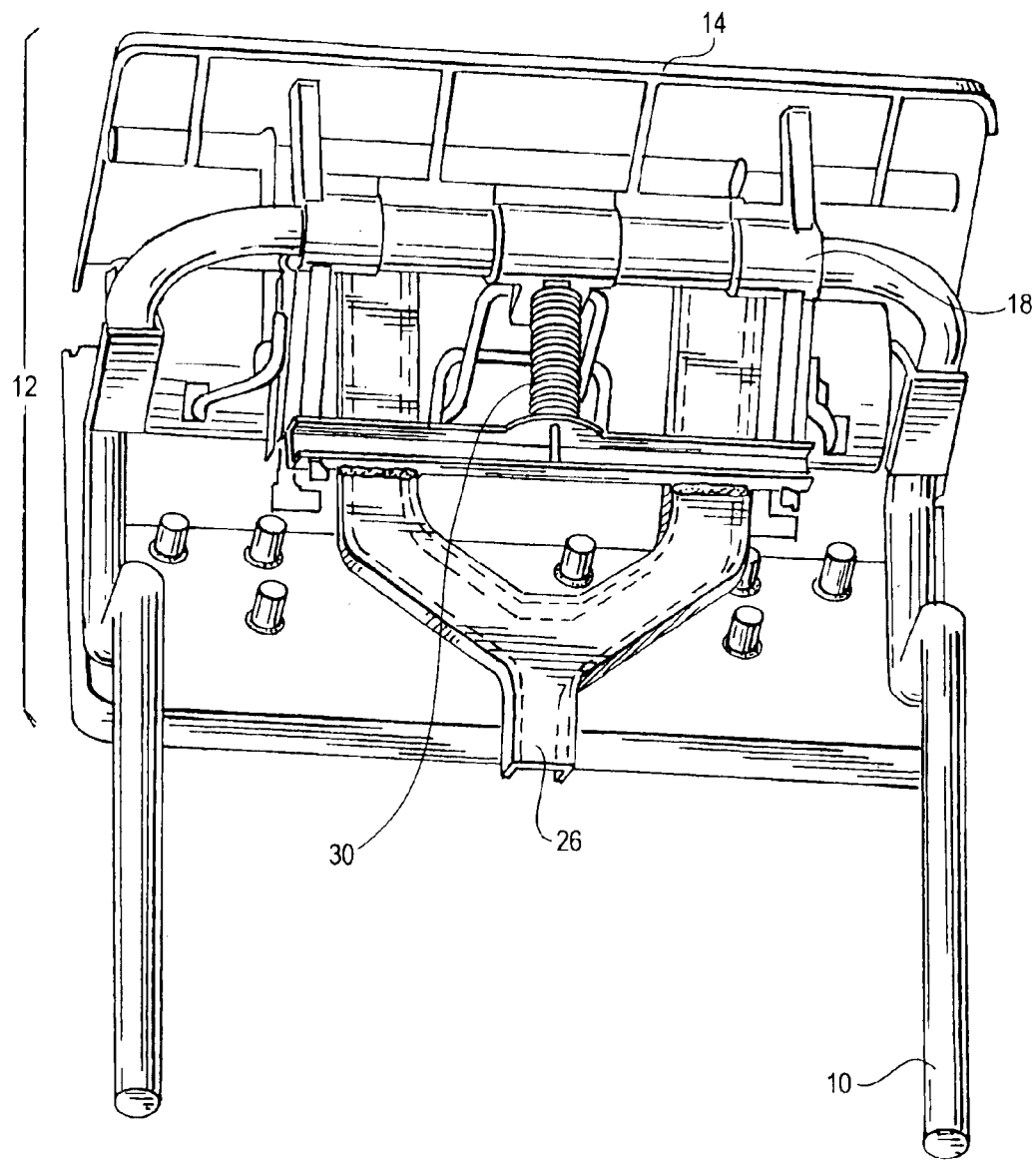
FIG. 6 is a detailed rear view of the head restraint arrangement.

Upon activation by impact, the trigger mechanism (not shown) disengages the frame 26 from the spring-loaded release arm 18. As seen in FIG. 5, the spring-loaded release arm 18 then rotates and the push rod 16 is moved in an upward direction. As this occurs, the spring-loaded release arm is locked to a stop. This motion can be controlled by a cable. The upward movement of the push rod 16 enables the pivot arm 22 to release the top flip-up member 14, the middle flip-up member 20, and the lower flip-up member 24.

Once the top flip-up member 14, middle flip-up member 20, and lower flip-up member 24 has been released the active head restraint arrangement is fully activated. In this position, the head and neck have additional protection against injury from impact. The active head restraint arrangement flips up in a forward and upward position to meet an occupant's head and neck that may be in motion due to the force of impact. As the active head restraint arrangement flips upward and forward, it does not catch on any foam or trim. In its preferred embodiment, there should be no interference from the foam or trim. Any interference could adversely affect the performance of the active head restraint arrangement.

In its preferred embodiment, the spring-loaded release arm 18 is spring loaded counterclockwise. After full actuation of the top flip-up member 14, middle flip-up member 20, and lower flip-up member 24, the spring-loaded release arm 18 that has been locked to a stop is snapped back counterclockwise and locks into the latch with teeth 32, as seen in FIG. 5. The spring-loaded release arm 18 is spring-loaded for two reasons. The first is that the spring 30 allows the spring-loaded release arm 18 to remain locked while the flip-up assembly 12 is in motion. The second reason is that once the spring-loaded release arm 18 is locked back to a stop, the spring 30 forces it to lock down on the latch with teeth 32. This ensures that the top flip-up member 14, middle flip-up member 20, and lower flip-up member 24 remains in place to fully support an occupant's head and neck.

After the trigger mechanism (not shown) is activated, the active head restraint arrangement is instantaneously released. In times of rear impact there is little time to activate safety devices. It is imperative that the active head restraint arrangement flips up at the time of impact so as to provide an occupant's head and neck with the most protection. This active head restraint arrangement provides a dynamic increase in height to best meet the head and neck in instances of impact.

The flip-up manner that this active head restraint arrangement is deployed allows for the head restraint to be smaller. The smaller size provides an occupant a better view around the seat while still providing maximum safety. Unobstructed views around a head restraint is desired to ensure driver safety. A head restraint using this active head restraint arrangement still allows an occupant to adjust the head restraint to a desired position, if the head restraint allows for such adjustment.

After activation seen in FIG. 5, this active head restraint arrangement is easily reset into its deactivated position, which is seen in FIG. 4. An occupant can reset the active head restraint arrangement manually. There is no need for servicing of the active head restraint arrangement after activation. By allowing an occupant to manually push the active head restraint arrangement back into its deactivated position, costs are kept down for the consumer. While this active head restraint arrangement can be reset manually, there can also be embodiments that require a tool to reset.

It is also possible for this active head restraint arrangement to utilize an alternate embodiment when flipping up to meet the head and neck. Instead of having the top of the head restraint contoured backwards, the head restraint can be arranged with the top flip-up member 14 at the same initial height as the middle flip-up member 20 and the lower flip-up member 24. Upon actuation, the top flip-up member 14 will then instantly flip up to a position in line with the middle flip-up member 20 and lower flip-up member 24 to afford an occupant's head and neck the appropriate protection. Another alternate embodiment also arranges the top flip-up member 14 at the same initial height as the middle flip-up member 20 and lower flip-up member 24. Upon actuation, the upper flip-up member 14 will then instantly slide up to a position above the middle flip-up member 20 and lower flip-up member 24. Both of the alternate embodiments dynamically increase the height of the head restraint.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A head restraint arrangement for a vehicle seat, the head restraint arrangement comprising:

a head restraint post associated with the vehicle seat;

a flip-up assembly including a lower flip-up member attached to the head restraint post, a middle flip-up member connected to the lower flip-up member, and a top flip-up member pivotally connected to the middle flip-up member; and a head restraint cushion connected to the top, middle, and lower flip-up members;

wherein the top flip-up member and corresponding head restraint-cushion are adapted to move from a deactivated position in which the top flip-up member and corresponding head restraint cushion extend in a substantially horizontal position away from a head of an occupant to an activated position in which the top flip-up member and corresponding head restraint cushion are pivoted to a substantially vertical position above the middle flip-up member to support the head of the occupant.

2. The head restraint arrangement as in claim 1, wherein the flip-up assembly further comprises a spring-loaded release arm disposed proximate the head restraint post, a frame attached to the spring-loaded release arm, a pivot arm having a latch with teeth configured to be engaged by the spring-loaded release arm, and a push rod pivotally coupled to the pivot arm at a first end and pivotally coupled to the top flip-up member at a second end.

3. The head restraint arrangement as in claim 2, wherein upon full actuation and release of the flip-up assembly the spring loaded release arm engages the latch with teeth to inhibit movement of the flip-up assembly.

4. The head restraint arrangement as in claim 2, wherein the push rod has a generally H-shaped configuration.

5. The head restraint arrangement as in claim 2, wherein the frame is connected to a trigger mechanism associated with the vehicle seat and upon activation of the trigger mechanism the frame disengages from the spring loaded release arm, the spring loaded release arm rotates and enables upward movement of the push rod, and movement of the push rod enables the pivot arm to release the top flip-up member, the middle flip-up member; and the lower flip-up member.

6. The head restraint arrangement as in claim 2, wherein the spring-loaded release arm further comprises a spring adapted to bias the spring-loaded release arm toward the deactivated position.

7. The head restraint arrangement as in claim 1, wherein upon release of the top flip-up member, the middle flip-up member, and the lower flip-up member at least a portion of the flip-up assembly moves upward and forward.

8. The head restraint arrangement as in claim 1, wherein the spring-loaded release arm is pivotally disposed on the head restraint post.

9. The head restraint arrangement as in claim 1, wherein the flip-up assembly is configured to be manually reset into the deactivated position.

* * * * *